April 21, 1970  C. W. NEHER  3,506,999

FAIR-LEAD GROMMET

Filed Aug. 5, 1968  2 Sheets-Sheet 1

INVENTOR.
CLARENCE W. NEHER
BY
— AGENT —

April 21, 1970 C. W. NEHER 3,506,999
FAIR-LEAD GROMMET
Filed Aug. 5, 1968 2 Sheets-Sheet 2

INVENTOR.
CLARENCE W. NEHER
BY
— AGENT —

United States Patent Office

3,506,999
Patented Apr. 21, 1970

---

3,506,999
FAIR-LEAD GROMMET
Clarence W. Neher, Long Beach, Calif., assignor to McDonnell Douglas Corporation, a corporation of Maryland
Continuation-in-part of application Ser. No. 707,085, Feb. 21, 1968. This application Aug. 5, 1968, Ser. No. 756,082
Int. Cl. B65d *11/26;* B66d *1/36*
U.S. Cl. 16—2        10 Claims

ABSTRACT OF THE DISCLOSURE

A generally tubular, diametrically divided, fair-lead grommet including two symmetrically interlocking halves forming an assembled grommet which normally supports a cable therein. Each tubular half of the grommet has a radially extending flange located axially a predetermined distance from a normally upper end thereof. A slotted skirt spaced concentrically about each tubular half of the grommet is dependent from the flange and extends axially a predetermined distance therefrom. The slotted skirts are appropriately shaped and cooperate with the flanges to permit proper installation of the interlocked tubular halves of the grommet in a suitable hole of a fair-lead plate structure.

CROSS-REFERENCE TO RELATED APPLICATION

This application is a continuation-in-part of application Ser. No. 707,085 filed Feb. 21, 1968, now abandoned.

BACKGROUND OF THE INVENTION

My present invention relates generally to grommets and more particularly to a control cable fair-lead grommet which is easy to install and, most importantly, gives a long cable life.

A fair-lead, or plate structure with holes therein and serving as a guide for control cables running through the holes to prevent chafing of the cables, is commonly provided with grommets in its holes to give better support and additionally reduced chafing of the cables. The fair-lead grommets are usually made of plastic such as nylon which is a tough, durable material that provides low frictional support for the cables.

A material such as nylon is not too pliable and a grommet fabricated from it provides good, low frictional support for a cable running through the grommet. However, such a grommet is usually difficult to install, either in a suitable hole in the fair-lead plate structure or on the cable itself. The generally tubular structure of certain prior grommets is centrally divided along a vertical plane to produce two symmetrical longitudinal halves which can be easily placed about the cable that is to be supported therein. The simple tubular structure of such prior grommets may be suitably shaped exteriorly and further slotted longitudinally along the lower length thereof to provide a compressible portion which can be press-fitted into and caught in an appropriately sized hole in the fair-lead plate structure. While such divided grommets can be easily placed about a control cable, they have not been entirely satisfactory because when the assembled grommet halves were pressed into the fair-lead hole therefor, the grommet halves were invariably forced slightly out of axial or longitudinel alignment relative to each other. As a result, sharp ridges are produced in the cable passageway within the grommet along the edges of the abutting surfaces of the tubular grommet halves and which ridges would seriously damage the moving (sliding) cable supported in the grommet.

In order to provide proper support for the cable passing through a fair-lead grommet, the passageway or hole through the grommet should not be too large or too small in diameter for the cable supported. Where the hole is too large, there is excessive play of the cable and where the hole is too small, there may be binding of the cable. In either instance, the cable would be unsatisfactorily supported and excessive wear occurs. However, even when the hole size in the prior grommets described above is reasonably correct for the cable to be supported therein, these grommets have the further problem in that when the assembled grommet halves were pressed into the fair-lead hole therefor, the tubular grommet halves remain compressed together in a manner such that the cable's passageway in the grommet is usually distorted in contour and/or changed in size undesirably. Moreover, misalignment of the two separate grommet halves may be further aggravated and the more serious problem due to the sharp abrasive ridges produced at the grommet division surfaces becomes even more pronounced.

The problems discussed above are partially avoided in another type of prior grommets wherein a grommet is formed with a longitudinally slotted skirt spaced concentrically about an inner tubular core. A flange is provided at the normally upper end of the grommet, extending radially from the slotted skirt which is suitably shaped at its lower end so that the shaped skirt and flange will secure the grommet in its fair-lead hole. The slotted skirt can, of course, be compressed during installation of the grommet in its fair-lead hole without unduly distorting or altering the size of the cable passageway in the grommet.

However, in order to avoid the more serious problem introduced by the sharp ridges produced in a divided grommet, the foregoing prior grommets were slit only on one side through both the concentric skirt and its tubular core to the cable passageway in a slantingly axial or longitudinal direction so that the grommet can be elastically stretched apart along the slit and placed about a cable. The slantingly slit grommet is somewhat like the common, slit piston ring. Since nylon is not very pliable or flexible especially in a grommet structure, such slit grommets cannot be made sufficiently long to provide proper and adequate cable support and yet permit the grommet to be stretched apart enough to receive the cable. Of course, the slit cannot be made too wide either because its sharp edges would then be exposed and readily contacted by the cable in the passageway. Thus, it has been found that the slit grommets do not have an adequate supporting area therein to give proper cable support, and are also still very difficult to install on a control cable.

SUMMARY OF THE INVENTION

Briefly, and in general terms, my invention is preferably accomplished by providing a generally tubular, diametrically divided, fair-lead grommet including two symmetrically interlocking halves forming an assembled grommet which normally supports a control cable therein. The grommet halves are relatively long and can be made of a very low friction, molydisulfide filled, molded nylon material, for example. The interlocking halves are essentially semicircular cylindrical shells and can be identical to each other. Each semicircular shell has a detent structure formed lengthwise on one longitudinal division surface thereof and a longitudinal channel or groove is formed in the other, diametrically opposite, division surface. The detent structure and the channel or groove in one grommet half complement and mate with the channel or groove and the detent structure, respectively, in the other opposing grommet half. The surfaces of each pair of mating detent structure and channel or groove are mutually self-centering and aligning to produce a congruent condition such that the two grommet halves are rigidly aligned and interlocked together by two diametrically separated pairs of such complementary surfaces. Thus, the tubular halves of the assembled grommet are firmly interlocked and kept aligned during and after installation of the grommet in its fair-lead hole. Sharp ridges therefore cannot be produced along the edges of the abutting, longitudinal division surfaces of the fair-lead grommet halves.

Each semicircular shell of the grommet also has a radially extending flange located axially a predetermined distance below a normally upper end thereof. A fully slotted, semicircular skirt spaced concentrically about each semicircular shell is dependent from its flange and extends axially a predetermined distance therefrom. The lower portions of the slotted, semicircular skirts are flaringly shaped to provide respective upper shoulders which engage the lower peripheral edge surfaces of the fair-lead hole while the flanges engage the upper peripheral edge surfaces thereof. The slotted skirts are radially deflected inwardly as the assembled grommet is pressed into an appropriately sized fair-lead hole. The skirts then spring back outwardly as the lower surfaces of the flanges contact the upper peripheral surface edges of the hole, whereby the skirt shoulders catch and lock the grommet in place to the fair-lead plate structure. Thus, the fair-lead grommet is secured and locked in place by independent, exterior grommet structure which can produce no effect upon the interlocked inner semi-circular shells, and there would be no detrimental change in size or distortion in contour of the grommet passageway which accommodates and supports the control cable passing therethrough.

BRIEF DESCRIPTION OF THE DRAWINGS

My invention will be more fully understood, and other features and advantages of the invention will become apparent from the following detailed description of two illustrative embodiments thereof. The detailed description is to be taken in conjunction with the accompanying drawings, in which.

DESCRIPTION OF THE PRESENT EMBODIMENT

Figure 1:
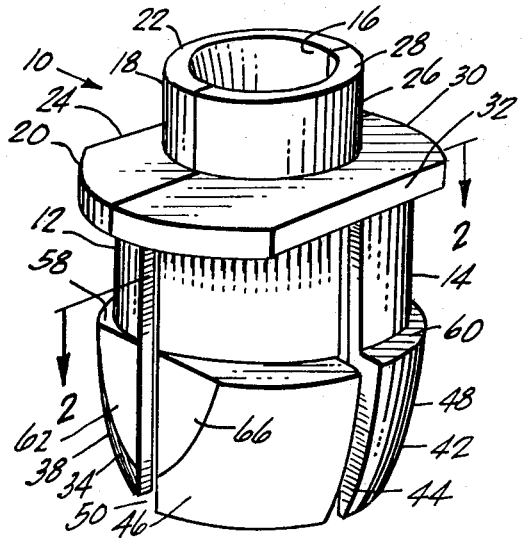
FIGURE 1 is a perspective view of one illustrative embodiment of an assembled fair-lead grommet constructed according to this invention.

FIGURE 1 is a perspective view of an assembled fair-lead grommet 10 which is constructed in one illustrative embodiment of my invention. The grommet 10 is generally in shape and includes two symmetrically positioned, interlocking tubular halves 12 and 14 which are substantially identical to each other. The interlocking tubular halves 12 and 14 form a central, relatively long, passageway 16. The tubular grommet half 12 has a semicircular cylindrical shell 18 from which there is a radially extending flange 20 located axially some distance below the normally upper end 22 of the shell 18. The flange 20 can be generally circular having a flat peripheral surface 24 which may be parallel to a vertical diametrical plane that divides the grommet 10 into two generally symmetrical halves. Similarly, the tubular grommet half 14 has a semicircular cylindrical shell 26 with a normally upper end 28, and a radially extending flange 30 with a flat peripheral surface 32, as shown.

Figure 2:
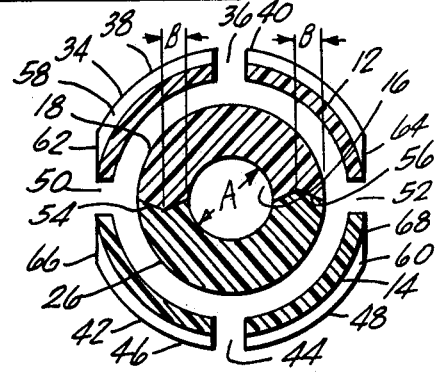
FIGURE 2 is a cross sectional view of the fair-lead grommet as taken along the line 2—2 indicated in FIGURE 1.

FIGURE 2 is a cross sectional view of the grommet 10 as taken along the line 2—2 indicated in FIGURE 1. The line 2—2 is located at the midpoint, lengthwise, of the grommet 10. A semicircular skirt 34 spaced concentrically about the semicircular shell 18 is longitudinally dependent from the lower surface of the flange 20 as shown in FIGURE 1. The skirt 34 preferably extends to the same length as that of the shell 18 and is equally divided by a relatively narrow slot 36 (FIGURE 2), to form two symmetrical skirt sections 38 and 40. Similarly, a semicircular skirt 42 spaced concentrically about the semicircular shell 26 is dependent from the lower surface of the flange 30 to a distance preferably equal to the normally lower end of the shell 26. The skirt 42 is also divided by a narrow slot 44 to form two symmetrical skirt sections 46 and 48. The left ends of the skirts 34 and 42 are terminated at points which form a relatively narrow slot 50, and the right ends thereof are similarly terminated at points which form the narrow slot 52. The four slots 36, 44, 50 and 52 are preferably of the same width and length.

The semicircular shell 18 has a triangular cross sectional ridge or detent structure 54 at its left end, and a complementary triangular cross sectional channel or groove 56 at its right end as can be seen in FIGURE 2. The detent structure 54 and groove 56 preferably extend longitudinally over substantially or nearly the entire length of the shell 18. By rotating the grommet half 14 through 180 degrees about its axis, it can be seen that it is identical to the grommet half 12. At the same time, it becomes apparent that the triangular cross sectional detent structure 54 is fully congruent with its mating triangular cross sectional groove 56. This, of course, produces a locking action between the grommet halves 12 and 14 throughout substantially their complete lengths. Moreover, the mutually self-centering and aligning action produced between correct cross sectional shapes for the detent structure 54 and groove 56 prevents any slippage or misalignment of the semicircular shells 18 and 26 and, consequently, of the diametrically separated and abutting longitudinal division surfaces therebetween. Accordingly, sharp surface ridges cannot be produced along the surfaces of the cable passageway 16.

Where the grommet 10 is of an appropriate size to use with a .500 to .510 inch diameter fair-lead hole and to support a ⅛ inch diameter cable therein, the midlength dimensions A and B indicated in FIGURE 2 can be, illustratively, .150 to .160 inch (diameter) and .045 to .050 inch, respectively. The dimensions A and B of the same grommet 10 for a ³⁄₁₆ inch diameter cable can be .215 to .225 inch (diameter) and .030 to .035 inch, respectively. Another example is for a ⁵⁄₃₂ inch diameter cable wherein the dimensions A and B of the grommet 10 can be .185 to .195 inch (diameter) and .035 to .040 inch, respectively. The overall length of the grommet 10 for these example is ⅝ inch. This is twice the length of a comparable size prior grommet of the slantingly slit type, for example, and provides a correspondingly greater cable support area therein. The outer diameter of the semicircular shells 18 and 26 is .344 inch, and the inner and outer diameters of the upper straight portion of the concentric skirts are respectively ⁷⁄₁₆ inch and ½ inch, for example.

The lower portions of the slotted, semicircular skirts 34 and 42 are suitably shaped to provide upwardly flaring portions that have respective upper shoulders 58 and 60 which engage the lower peripheral edge surfaces of a fair-lead hole (70) while the lower surfaces of the flanges 20 and 30 engage the upper peripheral edge surfaces thereof. As illustrated in FIGURES 1 and 2, the flared lower portion of the skirt 34 also has vertical axially parallel, left and right substantially flat areas 62 and 64. The purpose of these flat areas on the skirts 34 and 42 is to permit easy removal of the assembled grommet 10 from its fair-lead hole. It can be seen from FIGURE 2 that parallel left and right shoulder end segments have been removed from the outermost circle thereof. By squeezing both semicircular skirts 34 and 42 toward each other and closing the gaps or lower ends of the slots 50 and 52, the shoulders 58 and 60 can be made to clear the periphery of the engaging fair-lead hole and thus permit removal of the grommet 10.

Figure 3:
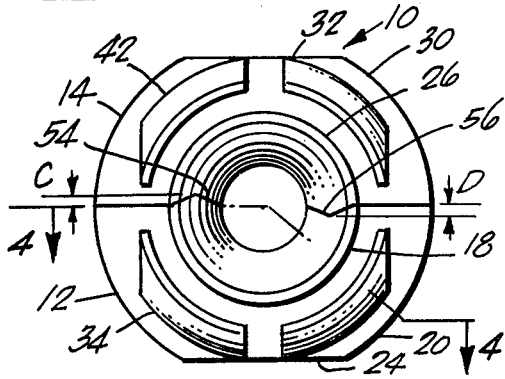
FIGURE 3 is a bottom plan view of the fair-lead grommet shown in FIGURE 1.

FIGURE 3 is a bottom plan view of the fair-lead grommet 10 shown in FIGURES 1 and 2. It is apparent that the flat surfaces 24 and 32 of the flanges 20 and 30, respectively, considerably reduce the diameter or distance between these parallel surfaces 24 and 32. The purpose of these flat surfaces 24 and 32, therefore, is to permit closer installation of adjacent grommets 10 on a fair-lead plate structure by positioning the flat surfaces 24 or 32 of a grommet substantially parallel and contiguous to corresponding flat surfaces of other adjacent grommets. It can also be seen from FIGURE 3 that the slotted, semicircular skirts 34 and 42 are located approximately midway radially between the outer circumference of the semicircular shells 18 and 26 and the circular outer circumference of the flanges 20 and 30. The semicircular shell 18 (and, of course, shell 26) has a triangular cross sectional detent structure 54 dimension C of .014 to .019 inch, and a complementary cross sectional groove 56 dimension D of .018 to .023 inch, for example. These example values of the dimensions C and D can be substantially the same for all three of the cable sizes of ⅛, ³⁄₁₆ and ⁵⁄₃₂ inch, although the dimensions A and B must be varied with cable size as described previously. The outer circumference of the lower end of the skirts 34 and 42 has a radius of .230 to .240 inch and flares outwardly and upwardly on a radius of 1(+¼, —0) inch, for example.

Figure 4:
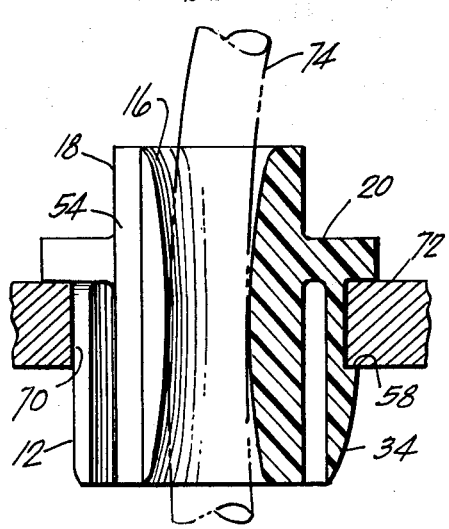
FIGURE 4 is a sectional view of the fair-lead grommet as taken along the line 4—4 indicated in FIGURE 3, with the grommet installed in a fair-lead plate structure.

FIGURE 4 is a sectional view of the fair-lead grommet 10 as taken along the line 4—4 indicated in FIGURE 3. A portion of the line 4—4 runs approximately 45 degrees from the horizontal, and the view along this portion has been rotated to a horizontal position when the line 4—4 is viewed in the direction of its arrows shown in FIGURE 3. The grommet 10 is also shown installed in a suitable hole 70 of a fair-lead plate structure 72 in FIGURE 4, and a control cable 74 passing through the grommet 10 is indicated in phantom lines. It is readily apparent that a relatively long passageway 16 is provided to give adequate support to the cable 74. Illustratively, for the ⅝ inch long grommet 10 mentioned in the above examples, the sectional contour of the passageway 16 has a radius of 2(+½, —0) inches and is terminated at the upper and lower ends by .045 inch radius ends. Thus, the passageway 16 has its most narrow diameter (dimension A in FIGURE 2) at midlength and flares gradually outwardly towards both upper and lower ends where it is terminated by small radius ends. The axial distance between the shoulders 58 and 60 to the lower surfaces of the flanges 20 and 30 is .136 to .146 inch, for example.

Figure 5:
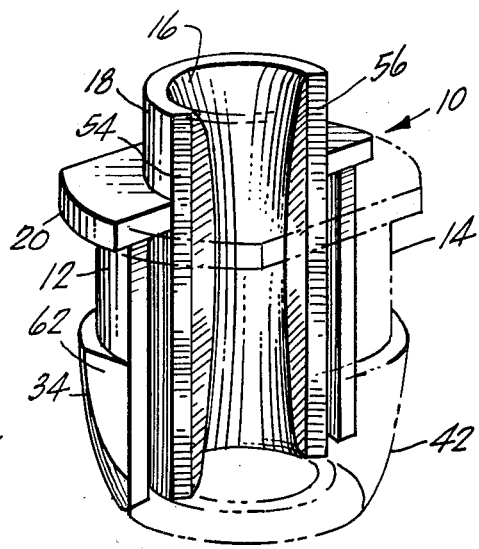
FIGURE 5 is a perspective view of the tubular grommet half generally shown in FIGURE 4.

FIGURE 5 is a perspective view of the tubular grommet half 12 generally as shown in FIGURE 4. The other half 14 of the assembled grommet 10 is partially indicated in phantom lines. The triangular cross sectional ridge or detent structure 54 on the left end of the semicircular shell 18 is clearly shown to extend over substantially the full length of the grommet half 12. Similarly, the complementary triangular cross sectional channel or groove 56 at the right end of the shell 18 also extends substantially over the full length of the grommet half 12. These detent structures 54 and groove 56 of the grommet half 12 provide a self-centering and aligning action with their respective complementary mating detent structure 54 and groove 56 of the other grommet half 14, to lock the two halves 12 and 14 firmly and accurately together over their full lengths. Thus, a passageway 16 is provided in the assembled grommet 10 wherein sharp surface ridges do not exist to cause any chafing or abrasion of the control cable 74 passing therethrough. In the illustrative example grommet 10, the radially outer longitudinal edges along the diametrically opposite division ends of the shells 18 and 26 are straight within a .005 inch total indicated reading, for example.

The grommet halves 12 and 14 can be substantially identical to each other, and a relatively long passageway 16 is produced in the assembled grommet 10 to provide adequate and proper support of the cable 74. While cross sectional configurations other than a symmetrical triangular one can be used for the detent structure 54 and its complementary groove 56, the triangular one provides a mutually self-centering and aligning action of the grommet halves 12 and 14 throughout their full lengths. Of course, it is possible to employ detent structure and complementary grooves or recesses which do not extend over substantially the full length of the fair-lead grommet 10, or are intermittently spaced but such methods are not as effective and reliable as the one disclosed herein.

The particular detent structure 54 and its diametrically separated complementary groove 56 additionally allow a relatively wide range of different sizes of the cable 74 to be used in the same grommet 10 with a minimum of dimensional changes required therefor. These changes are the very simple ones for the dimensions A and B discussed above in connection with FIGURE 2. Finally, the slotted and concentrically spaced semicircular skirts 34 and 42 permit installation of the grommet 10 in its fair-lead hole 70 without causing any distortion in contour or producing any detrimental change in size of the cable passageway 16 through the grommet 10. Moreover, the grommet 10 can be readily removed from its fair-lead hole 70 by squeezing together the lower portions of the semicircular skirts 34 and 42 in a direction parallel to the planes of the substantially flat areas 62, 64, 66 and 68 thereon. Otherwise, without these flat areas, the semicircular skirts 34 and 42 must be squeezed radially inward in all directions toward the center. This is very difficult to perform and accomplish.

Figure 6:
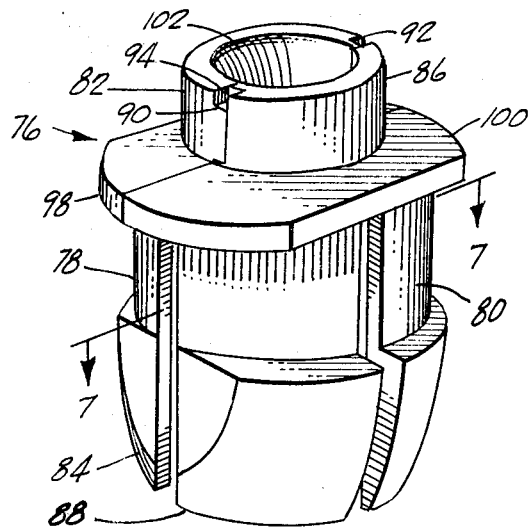
FIGURE 6 is a persepctive view of another illustrative embodiment of an assembled fair-lead grommet constructed according to this invention.

FIGURE 6 is a perspective view of an assembled fair-lead grommet 76 which is constructed in another illustrative embodiment or version of this invention. The view shown in FIGURE 6 is similar to the view of the grommet 10 shown in FIGURE 1. The difference between the grommet 76 and the grommet 10 lies essentially in their interlocking detent and groove structures. Since the grommets 10 and 76 are generally similar in structure, the description of the grommet 76 will be directed primarily to its detent and groove structures which interlock the tubular grommet half 78 to the tubular grommet half 80 in the assembled fair-lead grommet 76.

Figure 7:
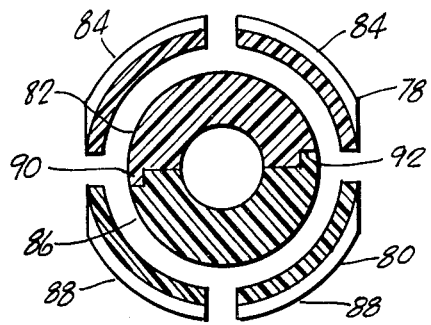
FIGURE 7 is a cross sectional view of the fair-lead grommet as taken along the line 7—7 indicated in FIGURE 6.

FIGURE 7 is a cross sectional view of the grommet 76 as taken along the line 7—7 indicated in FIGURE 6. The line 7—7 is located at the midpoint, lengthwise, of the grommet 76. The view of FIGURE 7 is, of course, similar to the view of FIGURE 2 for the grommet 10. The grommet half 78 includes a semicircular cylindrical shell 82 and a fully slotted or split semicircular skirt 84 spaced concentrically about the shell 82. Similarly, the grommet half 80 includes a semicircular cylindrical shell 86 and a fully slotted or split semicircular skirt 88 spaced concentrically about the shell 86. The semicircular shell 82 has a substantially rectangular cross sectional ridge or detent structure 90 at its left end, and a complementary rectangular cross sectional channel or groove 92 at its right end. By rotating the grommet half 78 through 180 degrees about its axis, it can be seen that it is identical to the grommet half 80. At the same time, it becomes apparent that the rectangular cross sectional detent structure 90 is fully congruent with its complementary (and mating) rectangular cross sectional groove 92. The groove 92 extends longitudinally over substantially the entire length of the shell 82.

Figure 8:
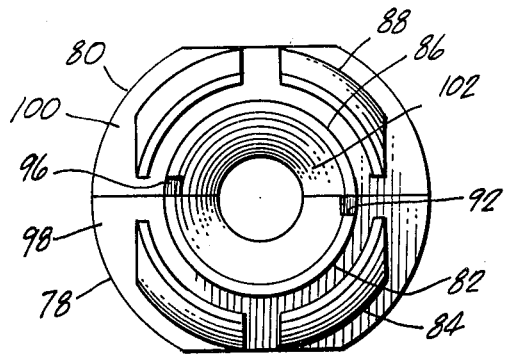
FIGURE 8 is a bottom plan view of the fair-lead grommet shown in FIGURE 6.

FIGURE 8 is a bottom plan view of the fair-lead grommet 76 shown in FIGURES 6 and 7. In this illustrative embodiment, the detent structure 90 extends longitudinally over nearly the full length of the shell 82, and terminates slightly below and above the upper and lower end surfaces, respectively, of the shell 82. Small recesses 94 and 96 are produced above and below the upper and lower ends, respectively, of the detent structure 90 as indicated in FIGURES 6 and 8. Flange 98 extends radially from the shell 82, and is located axially some distance below the normally upper end surface of the shell 82. Similarly, flange 100 extends radially from the shell 86, and is located axially at the same distance below the normally upper end surface of the shell 86 as the flange 98 is from the normally upper end surface of the shell 82.

Figure 9:
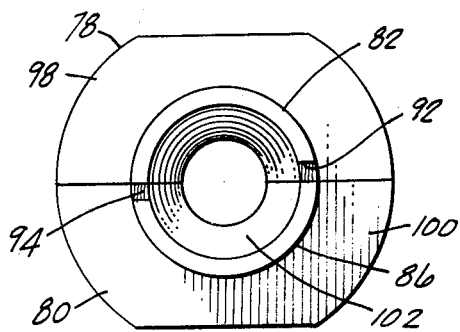
FIGURE 9 is a top plan view of the fair-lead grommet shown in FIGURE 6.

FIGURE 9 is a top plan view of the fair-lead grommet 76 shown in FIGURE 6. The assembled grommet halves 78 and 80 form a central, relatively long, passageway 102 which has its most narrow diameter at midlength and gradually flares outwardly towards both upper end lower ends of the semicircular shells 82 and 86. The grommet halves 78 and 80 are firmly interlocked and held aligned during and after installation of the grommet 76 in its fair-lead hole by their mating detent structures and complementary grooves. Relative lateral movement between the grommet halves 78 and 80 is clearly prevented, and a smooth passageway 102 without any sharp abrasive ridges therein is maintained at all times.

Figure 10:
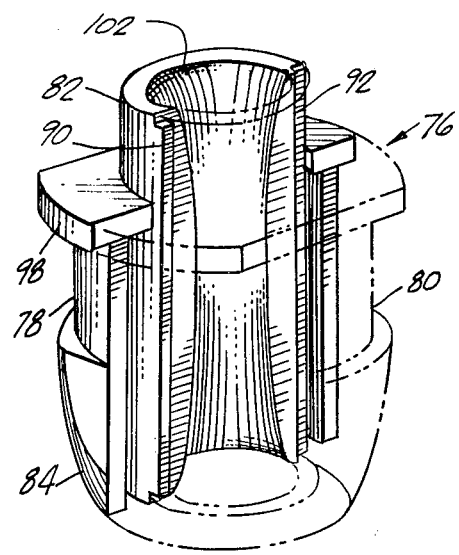
FIGURE 10 is a perspective view of the tubular grommet half generally shown to the rear in FIGURE 6.

FIGURE 10 is a perspective view of the tubular grommet half 78. The other grommet half 80 of the assembled fair-lead grommet 76 is partially indicated in phantom lines. The rectangular cross sectional detent structure 90 can be clearly seen to extend over nearly the full length of the semicircular shell 82 (to .045 inch, for example, of each of the upper and lower end surfaces). Similarly, the complementary rectangular cross sectional groove 92 is clearly shown to extend over substantially the full length of the shell 82. The detent structure 90 and complementary groove 92 are, in this illustrative example, longitudinally located along the radially outermost portions of the semicircular shell 82. This permits a variation of passageway 102 size (diameter) without having to change the dimensions of the detent structure 90 and complementary groove 92 for each different passageway 102 (and its supported cable) size.

For an illustrative ⅝ inch long grommet 76, the detent structure 90 can have a rectangular cross section which is a square with a side dimension of .022 to .028 inch, and its complementary groove 92 can have a corresponding rectangular cross section which is a square with a side dimension of .029 to .035 inch, for example. This ⅝ inch long grommet 76 can be used to support control cables of ⅛, ³⁄₁₆ and ⁵⁄₃₂ inch diameters by suitably varying the diameters of the passageway 102. That is, the minimum or midlength diameter of the passageway 102 is changed as was the dimension A (FIGURE 2) of the passageway 16 of the grommet 10 was changed to support the different sizes of control cables. The advantage with the grommet 76 is that the passageway 102 size can be varied over a relatively wide range without being required at the same time to change the dimensions of the detent structure 90 and its complementary groove 92. Of course, any change of the dimension A of the passageway 16 would of necessity require a change in the dimension B of the semicircular shell 18, if a symmetrical detent structure 54 and symmetrical complementary groove 56 are to be retained for the grommet 10. The grommet halves 78 and 80 of the grommet 76 are also interlocked more solidly or firmly with the rectangular cross section detent structure 90 and complementary groove 92 which have sharper locking corners than the triangular cross section detent structure 54 and complementary groove 56 of the grommet 10. The grommet 10, however, has the advantage of having grommet halves 12 and 14 which are somewhat more easily self-centered and aligned.

While some specific dimensions and types of materials have been disclosed in the foregoing description of my invention, such dimensions and types of materials were given as examples only are not intended to limit the scope of this invention in any manner. It is, therefore, to be understood that the examplary embodiments of the invention described above and shown in the accompanying drawings are merely illustrative of, and not restrictive on, my broad invention and that various changes in design, structure and arrangement may be made in the exemplary embodiments without departing from the spirit and scope of the appended claims defining my invention.

I claim:

1. An easily installed fair-lead grommet giving adequate support and long life to a cable passing therethrough, said grommet comprising:
   a first tubular grommet half including
      a semicircular cylindrical shell of a relatively long length,
      a detent structure provided on one normally vertical and longitudinally extending end surface of said shell,
      a complementary groove structure provided on the other, diametrically separated, normally vertical and longitudinally extending end surface of said shell,
      a flange extending radially outwards from said shell and located axially at a predetermined position on the normally upper portion of said shell, and normally engaging the upper peripheral edge surfaces of a fair-lead hole,
      a slotted, semicircular skirt concentrically spaced a predetermined distance from the cylindrical outer surface of said shell and dependent from the lower surface of said flange axially a predetermined distance, the lower portion of said semicircular skirt being flared outwardly upwards to provide a shoulder thereon for normally engaging the lower peripheral edge surfaces of said fair-lead hole; and
   a second tubular grommet half which is substantially identical to said first tubular grommet half and normally assembled with said detent structure and groove structure of said first grommet half mating congruently with the groove structure and detent structure, respectively, of said second grommet half whereby said first and second grommet halves are thereby mutually centered and aligned with each other and interlocked together to provide a smooth passageway through said grommet which is free of any sharp abrasive ridges therein.

2. The invention as defined in claim 1 wherein said semicircular skirts of said first and second grommet halves are provided with normally vertical and parallel, substantially flat areas respectively on the diametrically separated, exterior side surfaces of said lower portions of said skirts whereby said grommet can be easily removed from its fair-lead hole by squeezing said lower portions of said skirts together in a direction parallel to the planes of said flat areas.

3. The invention as defined in claim 1 wherein said semicircular skirt is dependent from the lower surface of said flange axially a distance equal to the normally lower end surface of said shell.

4. The invention as defined in claim 1 wherein said detent structure extends over nearly the full length of said longitudinally extending end surface of said shell, and said complementary groove structure correspondingly extends over nearly the full length of said other, diametrically separated, longitudinally extending end surface thereof.

5. The invention as defined in claim 1 wherein said detent structure has a symmetrical triangular cross sectional surface and said complementary groove structure has a symmetrical triangular cross sectional surface which is substantially congruent to that of said detent structure.

6. The invention as defined in claim 1 wherein said detent structure extends over substantially the full length of said longitudinally extending end surface of said shell and has a symmetrical triangular cross sectional surface, and said complementary groove structure correspondingly extends over substantially the full length of said other, diametrically separated, longitudinally extending end surface of said shell and has a symmetrical triangular cross sectional surface which is substantially congruent to that of said detent structure.

7. The invention as defined in claim 1 wherein said detent structure has a rectangular cross sectional surface and said complementary groove structure has a rectangular cross sectional surface which is substantially congruent to that of said detent structure.

8. The invention as defined in claim 7 wherein said detent structure and said complementary groove structure are located along radially outer portions of said shell.

9. The invention as defined in claim 1 wherein said detent structure extends over nearly the full length of said longitudinally extending end surface of said shell and has a rectangular cross sectional surface, and said complementary groove structure correspondingly extends over nearly the full length of said other, diametrically separated, longitudinally extending end surface of said shell and has a rectangular cross sectional surface which is substantially congruent to that of said detent structure.

10. The invention as defined in claim 9 wherein said detent structure and said complementary groove structure are located along radially outer portions of said shell.

References Cited

UNITED STATES PATENTS

| | | | |
|---|---|---|---|
| 2,277,637 | 3/1942 | Eby | 16—2 X |
| 2,329,529 | 9/1943 | Gwinn et al. | 16—2 X |
| 2,470,886 | 5/1949 | Buzzell | 174—83 X |
| 2,495,252 | 1/1950 | Hansen et al. | |
| 2,559,759 | 7/1951 | De Swart | 16—2 |
| 3,123,662 | 3/1964 | Fink | 16—2 X |
| 2,912,712 | 11/1959 | Shamban et al. | 16—2 |
| 3,372,960 | 3/1968 | Fisher. | |
| 3,424,857 | 1/1969 | Miller et al. | |

CHARLES E. O'CONNELL, Primary Examiner

I. A. CALVERT, Assistant Examiner

U.S. Cl. X.R.

254—190